United States Patent Office 2,973,973
Patented Mar. 7, 1961

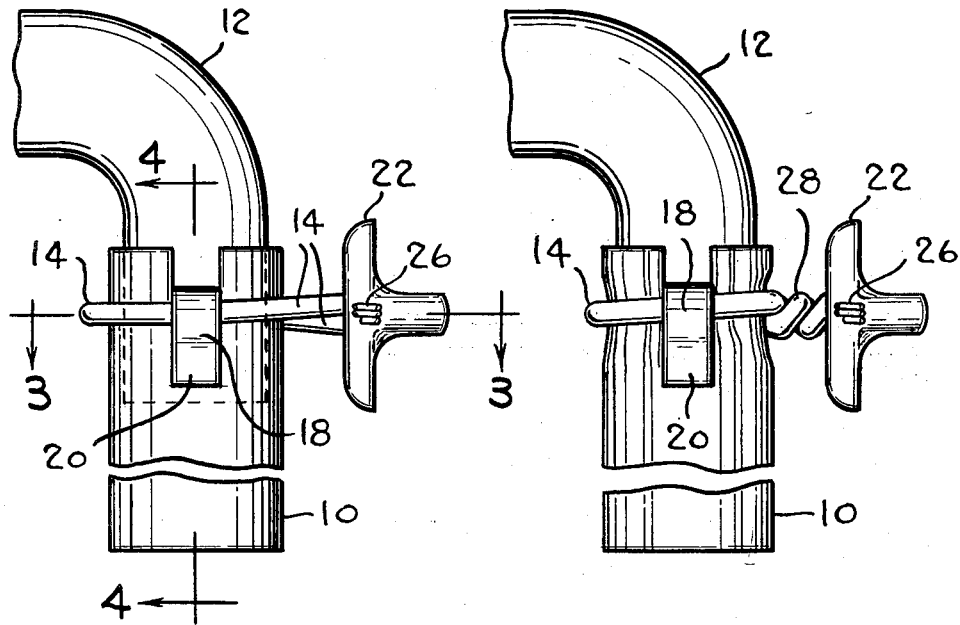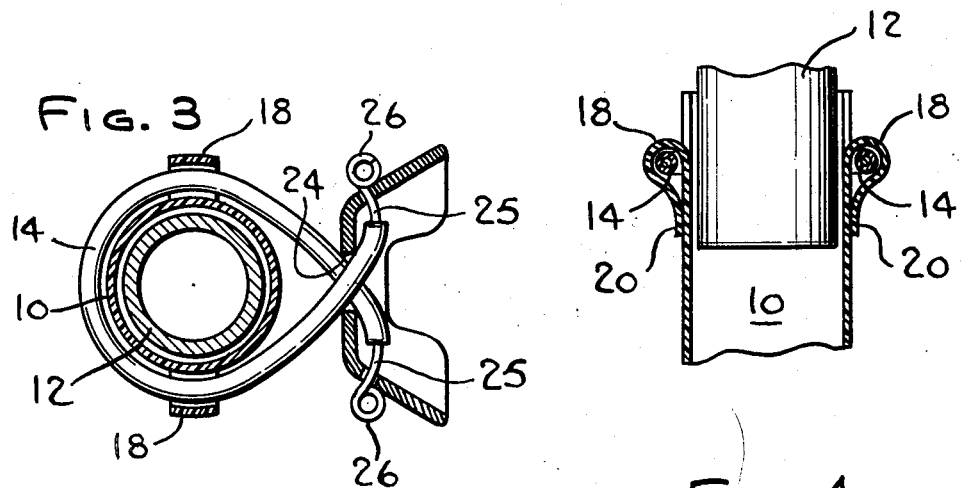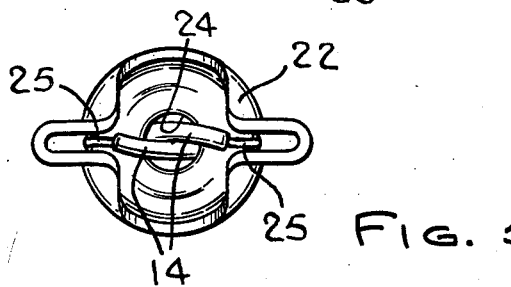

2,973,973

HOSE AND CONNECTOR FOR EMERGENCY USE

John C. Borth, 2540 N. 93rd St., Milwaukee, Wis.

Filed Oct. 4, 1957, Ser. No. 688,293

1 Claim. (Cl. 285—8)

This invention relates to a device for connecting a hose to a household faucet for fire protection purposes.

The object of this invention is to provide a low cost device for quick and effective coupling of a hose to a faucet when an emergency arises.

The device includes a length of hose having a wire captured at one end and a twisting member permanently fastened to the wire for drawing it tightly around the hose to couple the hose to an ordinary household faucet. The assembled device is kept readily available in the home for quick connection to a faucet when an emergency arises.

Other objects and advantages will be pointed out in, or be apparent from the specification and claim, as will obvious modifications of the single embodiment shown in the drawings, in which:

Fig. 1 is a side view of the device fitted on a faucet but not tightened thereon;

Fig. 2 is a view similar to Fig. 1 but with the hose tightened in position for use;

Fig. 3 is a sectional view taken along line 3—3 of Fig. 1;

Fig. 4 is a sectional view taken along line 4—4 of Fig. 1; and

Fig. 5 is a plan view of the tightening wing nut with the ends of the wire fastened thereto.

Referring now to the drawings, Fig. 1 shows a hose section 10 of suitable length for fire protection purposes in the home. The hose is of sufficient internal diameter to fit over the outlet of an ordinary unthreaded household faucet 12, as shown in the drawings. Encircling the end of the hose and faucet is an insulated wire 14.

The wire is captured and held in the proper position on the hose by a plurality of loops made by bending back tabs 18 which extend axially from the open end of the hose and securing the free ends 20 of the tabs to the hose. As clearly shown in the drawings, tabs 18 may be cut back from the end of the hose to provide loops which are spaced from the end of the hose to thereby prevent the wire from slipping off the hose during installation. The possibility of a delay at the time of an emergency is thereby avoided.

While hoses of various material can be used, plastic hose is particularly well adapted for my device. Tabs 18 for capturing wire 14 can be readily cut and attached to the hose by application of heat and pressure along ends 20. Plastic hose is light, easily stored and will not deteriorate.

Wire 14 is tightened on the hose and faucet to provide a sealed coupling by means of a stamped wing nut shaped part 22 having a central opening 24 through which the ends of the wire extend. The uninsulated ends 25 of the wire are permanently fastened or anchored in the nut by passing them through opening 24 on either side of central opening 22 and curling the ends of the wire as at 26.

An insulated wire 14 is used to prevent cutting the hose when tightened. It should be understood, however, that an uninsulated wire could be used resulting in lower cost.

While only two tabs 18 are shown, it should be understood that additional tabs may be provided if necessary to properly capture the wire on the hose.

When an emergency arises the hose is removed from its place of storage and slipped on the end of the faucet (Fig. 1). The tightening wire and nut captured on the hose are properly positioned for use without further manipulation. The coupling is quickly and effectively completed by rotating nut 22 to twist wire 14 as at 28 to thereby tighten the hose on the faucet (Fig. 2).

Although but one embodiment of the present invention has been illustrated and described, it will be apparent to those skilled in the art that various changes and modifications may be made therein without departing from the spirit of the invention or from the scope of the appended claim.

I claim:

An attachment for a faucet and the like comprising, a length of hose having one end adapted to slide telescopically on the end of a faucet, a wire encircling said hose inwardly of said one end, means for tightening the wire on the hose, said hose being longitudinally slotted from said one end inwardly thereof to provide a plurality of circumferentially spaced tabs integral with said one end of the hose and with the free ends thereof looped back over said wire and fastened to the hose thereby forming closed loops for capturing the wire and retaining the same on the hose at said one end, said tightening means comprising a stamped wing nut shaped part with a central opening therein through which the ends of said wire extend, said ends of the wire being fastened to the wings of the nut on opposite sides of said opening.

References Cited in the file of this patent

UNITED STATES PATENTS

| 316,566 | Pierce | Apr. 28, 1885 |
| 795,210 | Evans | July 18, 1905 |
| 889,238 | Jensen | June 2, 1908 |
| 1,790,111 | Pike | Jan. 27, 1931 |
| 2,550,186 | Clamp | Apr. 24, 1951 |
| 2,742,939 | Larson | Apr. 24, 1956 |
| 2,779,976 | Roberts et al. | Feb. 5, 1957 |
| 2,810,593 | Petoskey | Oct. 22, 1957 |

FOREIGN PATENTS

| 10,074 | Great Britain | June 25, 1902 |
| 3,834 | Great Britain | Feb. 23, 1905 |